Nov. 21, 1961   P. E. WILLIAMS ET AL   3,009,670
AIRPLANE WITH ADJUSTABLE WINGS AND TAIL
Filed April 9, 1959   5 Sheets-Sheet 1

Paul E. Williams
Carl O. Horst
INVENTORS.

BY *Clarence A. O'Brien*
*and Harvey B. Jacobson*
Attorneys

Nov. 21, 1961  P. E. WILLIAMS ET AL  3,009,670
AIRPLANE WITH ADJUSTABLE WINGS AND TAIL
Filed April 9, 1959  5 Sheets-Sheet 2
Fig. 3
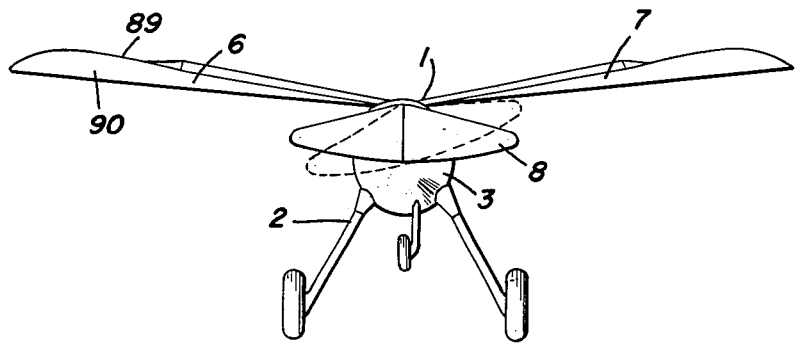
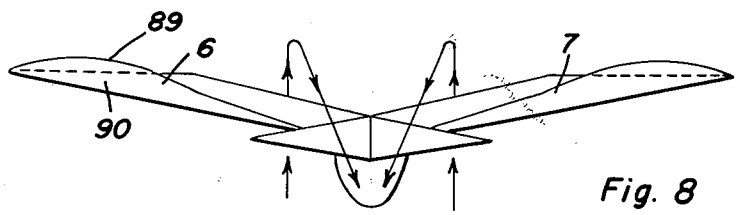
Fig. 8
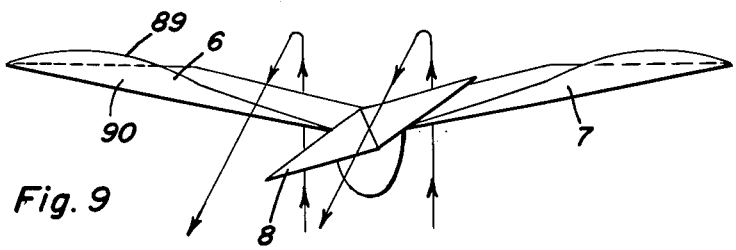
Fig. 9
Paul E. Williams
Carl O. Horst
INVENTORS

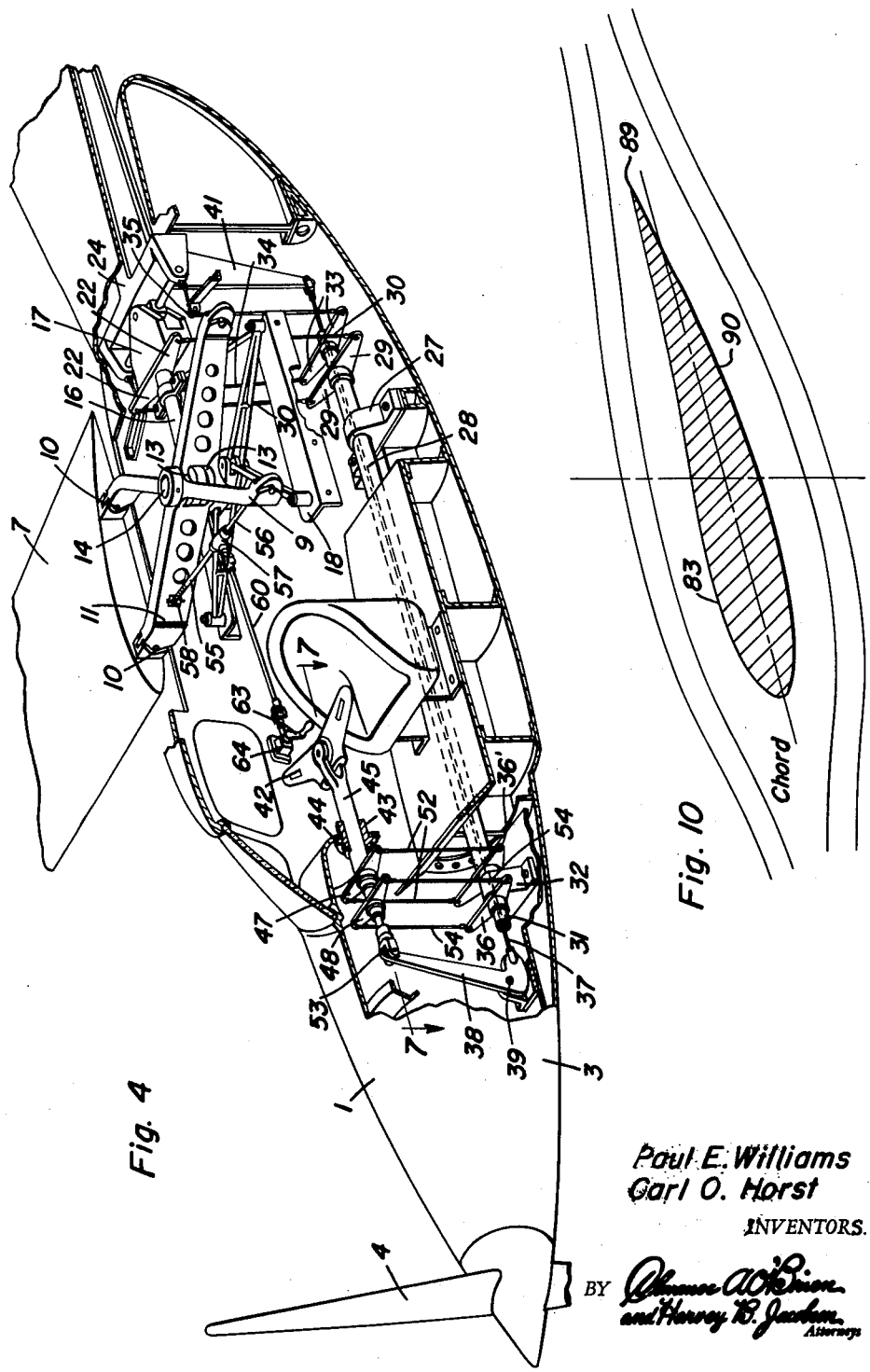

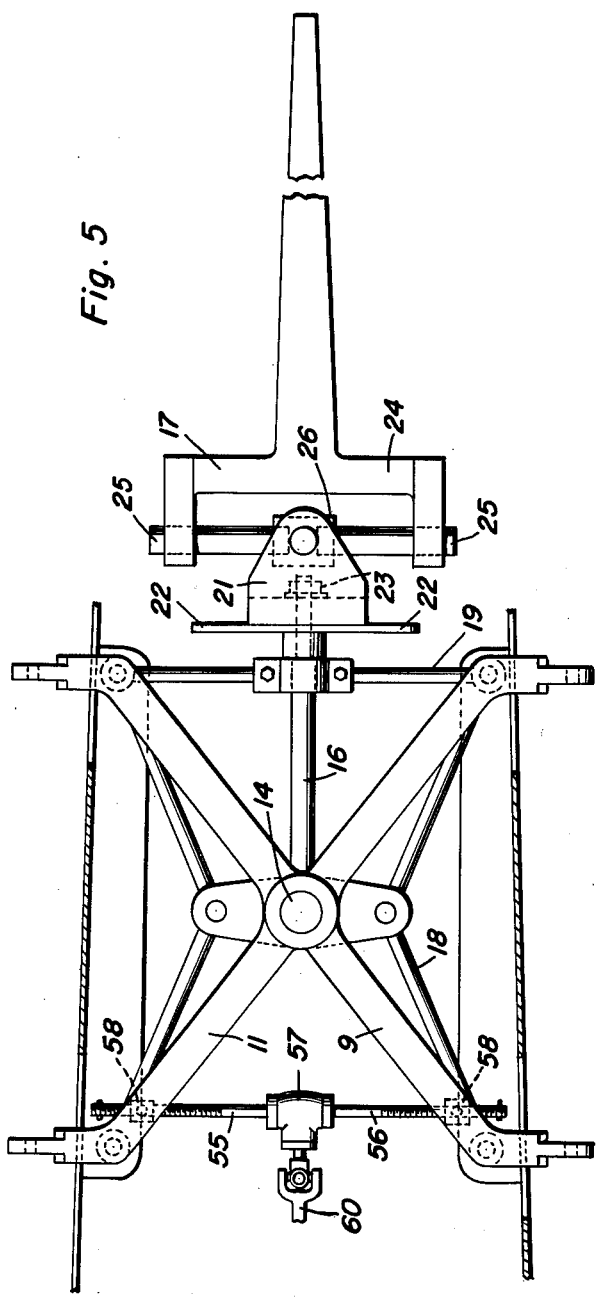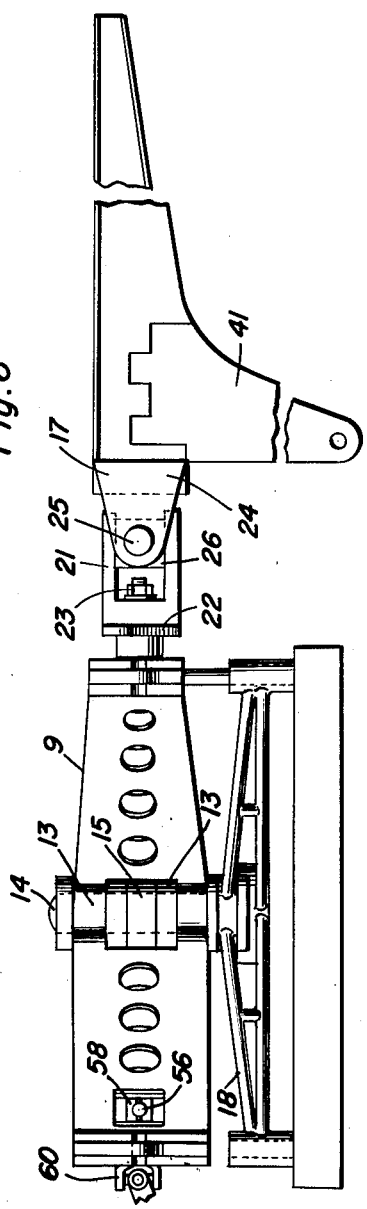

Nov. 21, 1961 P. E. WILLIAMS ET AL 3,009,670
AIRPLANE WITH ADJUSTABLE WINGS AND TAIL
Filed April 9, 1959 5 Sheets-Sheet 5

Paul E. Williams
Carl O. Horst
INVENTORS.

3,009,670
AIRPLANE WITH ADJUSTABLE WINGS AND TAIL
Paul E. Williams, Washington, D.C., and Carl O. Horst, Dayton, Ohio, assignors, by mesne assignments, to Advanced Aircraft Development Corporation, Falls Church, Va., a corporation of Virginia
Filed Apr. 9, 1959, Ser. No. 805,171
11 Claims. (Cl. 244—46)

This invention relates to heavier than air airplanes and more particularly to an airplane having an effective infinite aspect ratio, and a novel arrangement and manner of controlling its wing and tail.

An object of the invention is to provide an airplane wherein the efficiency of operation is considerably improved over known successful airplanes, by virtue of increasing the aerodynamic efficiency of the airplane. Certain advances in the design of our airplane have made it possible to increase the airplane efficiency to the extent of having a very large ratio of weight to horsepower, and maximum speed to minimum speed. Furthermore, the airplane has eliminated the ailerons and rudders ordinarily found in airplanes and provides a new system for airplane control.

The nature and substance of the invention may be considered as contained principally in an effectively infinite aspect ratio airplane and secondly, the wing which flies with an effectively infinite aspect ratio together with a tail which is integrated with the fuselage and wing in a particular manner to alter a two dimensional flow condition generated by the airplane configuration i.e. extend or deflect it, to achieve all of the necessary and desirable attitudes and directional control for the aircraft with minimal aerodynamic drag.

Our wing has areas which are arbitrarily designated as inboard and outboard panels respectively, although structurally each semi-span containing a single inboard and a single outboard panel, is made by usual fabrication techniques as a single unit and the panels may not be visibly distinguishable. The inboard panels and the major portion of the outboard panels fly in a two dimensional flow with effectively near infinite aspect ratio; the inboard panels and major portions of the outboard panels are the principal lift producing parts of the wing. The outboard panels resolve the aerodynamic relations into lift and thrust component due to the inclination of the section. The existence of the outboard panels induces flow in such directions as to enable the entire inboard panels and much of the outboard panels to fly as in infinite aspect ratio. To the extent that the outboard panels enable the inboard panels and some area of the outboard panels to operate under essentially ideal conditions, i.e. two dimensional flow, the outboard panels contribute greatly to lift of the entire airplane.

The outboard panels are preferably swept back while the inboard panels are swept forward. An apex may be at the juncture of the inboard and outboard panels. This juncture may occur at 33–44% of span as measured from the root, depending on various aerodynamic factors. The spanwise component of flow is reduced as compared to standard aircraft. Two things are directly achieved by this condition. First, a flow barrier is established at the juncture of the outboard panels with the inboard panels and this flow barrier operates precisely as infinitely long and high plates which are physically secured to the tips of a wing such as is usually considered to produce ideal two-dimensional flow. Such plates are obviously structures to be considered only in theorical aerodynamics and cannot be used for practical flight. However, the benefits of such plates are obtained by our outboard panels preventing a spanwise outboard and upward flow over the lower surface of the wing in flight. In a standard airplane the flow starts on to the wing chordwise, enters an area of maximum compression and turns abruptly (inboard or outboard depending on whether it is on the top or bottom) spanwise. Our wing prevents the build up of the maximum pressure on its lower surface at the tip thereby allowing the air to continue without the abrupt change in direction. The second thing achieved by the outboard panels is to induce chordwise inboard and upward flow on the bottom surface and at the same time accelerating that flow so that the flow velocity over the bottom surface is greater than the forward flight velocity of the wing.

Although there have been prior proposals to obtain flight control and attitude changes in numerous ways, the majority of these proposals rely on the production of moments by adjusting ailerons, aileron equivalents and a rudder or rudder equivalents properly located with reference to the longitudinal axis of the airplane and the center of gravity of the airplane to obtain sufficiently high moments. This airplane has a single tail made of a flat panel or an essentially flat panel that has a dihedral along a center line, properly located with reference to the wing semi-spans and the fuselage. The tail has a universal joint movement, being connected to the fuselage by an articulated structure. The various positions of the tail to achieve airplane control and attitude changes are listed in a subsequent schedule herein. However, the tail is not only integrated with the fuselage and wing to achieve flight control, but it also serves to extend the two dimensional flow of the inboard panels of the semi-spans and produce a considerable amount of control of the air flowing off the trailing edge of the inboard wing panels. For each aircraft configuration, then, the location of the tail is reasonably critical. If it is too close to the wing semi-span inboard panels it will not function to extend the two dimensional flow to the greatest extent. If it is located too far rearwardly of the inboard panels of the semi-span there will not be the necessary continuity and straightening of flow required to extend the two dimensional flow of the inboard panels. The same applies to the vertical positioning of the tail. Properly located, the tail then becomes a combination control element for aircraft maneuvering and an air flow control for the two dimensional flow over surfaces of the inboard panels of the wing semi-spans.

The physical existence of the tail of our airplane in a location described with reference to the two-dimensional flow inboard panels of the wing semi-spans, controls the air flow leaving the trailing edge of the wing inboard panels and without the assistance of any other mechanical device as slots, ducts, etc.

The components of flow across the semi-span, which are induced by the outboard panels and in a selected direction overcomes a problem existing in conventional wings. Wing tip vortices or other turbulence because of selected flow direction, do not exist in our airplane. This source of drag is thereby eliminated, and all aerodynamic drag across the inboard panels (which may be 33 to 44% of the span) is effectively cancelled. The leading edge of the outboard panel separates the flow in such a manner that the flow will be streamline. There will be a pressure reduction at the trailing edge of the underside of the outboard panel. This pressure reduction will equalize the pressure reduction at the trailing edge on the upper surface so that the usual upward flow at the wing tip is prevented, this being the reason that tip turbulence does not exist. The velocity increasing profile of the undersurface of the outboard panels e.g. a venturi shape induces flow velocity near the leading edge so that the flow at that point has a higher velocity than the forward speed of the wing.

An important feature of this invention is in the use of the modified delta shaped tail. When combined with wing semi-spans as described above, the tail is capable of establishing the angle of descent or the glide angle while the horizontal reference level of the airplane is approximately horizontal at any angle of descent. With the wing shifted forward and the tail pivotally adjusted to a down position as illustrated in solid lines in FIGURE 1, for example 60°, the wing generates maximum lift and maximum drag. The flow passing over the wing and then over the tail assumes an angle of 60°. The reaction to that flow is also 60° but in the opposite direction. Accordingly, the flight path is down 60°, but note that the airplane remains in a nose up attitude and is descending. The airplane can and does glide with the nose up requiring a very short flight path to land.

In accordance with the foregoing it is an object of the invention to provide an aerodynamically efficient airplane wherein the wings, fuselage and tail are integrated as a unit to improve aerodynamic efficiency and to provide maneuvering and attitude controls by altering the lift coefficients and changing the center of pressure as opposed to creating moments by aerodynamic functions such as deflecting a rudder in the airstream or deflecting ailerons or rudder and aileron equivalents.

Another object of the invention is to provide an airplane which has structural features enabling the wing semi-spans to be adjusted fore and aft of the fuselage projecting selected areas of the outboard panels forward, and enabling the comparatively large area tail to be articulated about X, Y and Z axes.

Other objects and features will become evident in following the description of the illustrated airplane, the illustrations and description concerning only one of numerous possible airplanes which are made in accordance with the principles of the invention. The drawings, therefore, are to be considered only as an example of one airplane and are not to be interpreted as limiting the invention to a single airplane.

FIGURE 3 is a rear elevational view of the airplane showing the tail arranged for level flight, and also showing in dotted lines the tail rolled for banking the airplane.

FIGURE 4 is a fragmentary perspective view of the airplane with parts shown in section, illustrating principally one control mechanism configuration for adjusting the wing semi-spans and tail to the various positions.

FIGURE 5 is a top view of a part of the control mechanism for the wing and tail.

FIGURE 6 is a side view of the mechanism in FIGURE 5.

FIGURE 8 is a diagrammatic rear view of the airplane showing the tail level and the air flow lengthwise of the airplane moving up from the front of the airplane and spilling down off the tail.

FIGURE 9 is a diagrammatic rear view of the airplane showing the tail in a rolled position and the flow which is continuous from the leading to trailing edge of the wing only on one-semi-span and the flow continuous from the wing leading edge over the trailing edge of the tail for the other semi-span thereby altering the lift coefficient of one semi-span to roll the airplane while in flight.

FIGURE 10 is an enlarged diagrammatic selectional view showing the profile at 11—11 of FIGURE 2.

Figure 1:
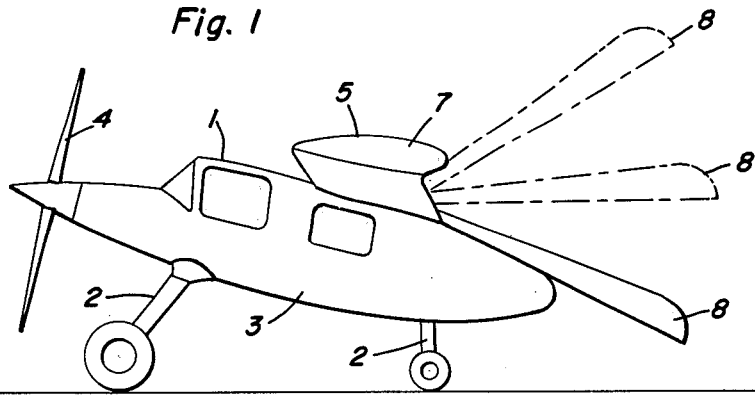
FIGURE 1 is a side view of the airplane in which the tail is shown in the take-off and landing positions in solid lines and in an intermediate cruising flight position in dotted lines and in a raised position in dotted lines for descending or gliding.

The first part of the following description is devoted principally to a description of the mechanical details of the aircraft structure. Airplane 1 has an ordinary landing gear 2 preferably connected to fuselage 3. Propeller 4 is at the front of the fuselage and is driven by a conventional engine (not shown). Wing 5 has two semi-spans 6 and 7 projecting laterally from the fuselage, and tail 8 is located downstream of the wing semi-spans by being attached to an articulated joint structure that is anchored in the fuselage. The semi-span spars (FIGURE 4) are attached at their root ends to esentially V-shaped trusses 9 and 11 respectively by pivot connections 10 allowing the wing semi-spans to have independent limited flapping motions to enable each semi-span to seek its own dihedral by flapping in wind gusts. Pivot connections 10 are simply horizontal pivot pins passing through aligned apertures in the interdigitated portions of the spars and trusses 9 and 11 with limited pivotal movement of the wing semi-span permitted, the limit established by stops formed by the confronting adjacent parts of the trusses and wing spars.

Trusses 9 and 11 constitute a part of the means for mounting the wing semi-spans so that they are capable of being adjusted fore and aft on the fuselage. Trusses 9 and 11 have apices which are interlocked by hinge butts 13, and king pin 14 extends through the aligned openings of th hinge butts 13. A tail supporting shaft or arm 16 has an eye 15 at its inner end which is engaged with king pin 14 and fitted between hinge butts 13 (FIGURE 6). Shaft 16 functions as a support for an articulated joint 17 (FIGURES 5 and 6) by which tail 8 is connected with the airplane. A king pin supporting frame 18 made of ordinary truss construction is secured to the fuselage structural framing and retains the king pin 14 in an upright position. Bearing bracket 19 is attached to structure 18 and furnishes partial support for shaft 16. Yoke 21 is pivotally mounted on a spindle at the end of shaft 16 and has a pair of rocker arms 22 which protrude laterally from the yoke. The pivotal connection of yoke 21 is obtained by having an opening in one end of the yoke through which the spindle at the extremity of shaft 16 extends, and there is a nut 23 on the spindle holding the yoke assembled on the shaft but enabling the yoke to be oscillated about the longitudinal axis of shaft 16. Tail yoke 24 is provided with a pair of trunnions 25 that are engaged with block 26, the latter disposed between the top and bottom plates of yoke 21. The trunnions 25 are aligned and establish an axis of pivotal movement for tail yoke 24. The block 26 is capable of oscillating about the longitudinal axis of the short spindle attached to and located between the upper and lower plates of yoke 21. Accordingly, tail yoke 24 is not only capable of oscillating about the axis of trunnions 25, but it may also oscillate about the longitudinal axis of the block 26 spindle. Further, the entire articulated joint 17 may be rotated about the longitudinal axis of shaft 16 on the shaft spindle. It is now evident that the tail 8 may be articulated in any direction, and the wing semi-spans may be shifted fore and aft on the fuselage.

Mechanical, pneumatic, electric or hydraulic means or combinations thereof may be used to actuate the wing semi-spans and the tail. For the purposes of illustration a wholly mechanical system is disclosed. The structure in FIGURE 4 includes a bearing 27 mounted in the fuselage and supporting a telescoping torque shaft 28. A pair of rocker arms 29 is attached to the outer section of the shaft 28 and located behind bearing 27. A pair of cables 30 is attached to rocker arms 29 and to the extremities of arms 22. These are secured to the yoke 21 so that the yoke 21 is capable of being oscillated about the longitudinal axis of shaft 16 in response to rotation of the outer section of telescoping torque shaft 28. The rear end of torque shaft 28 has a pair of rocker arms 33 secured to the inner section or shaft 31, the latter being supported in part by bearing 32 at the front part of the telescoping shaft 28. Cable 34 is attached to one end of rocker arm 33 and is guided by a pulley 35 or the like intermediate its ends, cable 34 having its outer extremity attached to one end of yoke 24. An identical cable 34 is attached to the opposite end of the rocker arm 33, guided over a pulley and secured to the opposite end of yoke 24. It is evident that oscillation of the inner shaft 31 will cause the rocker arm 33 to be oscillated thereby pivotally adjusting tail yoke 24 about the upright pivot axis of the pivot in block 26.

A control lever 38 is mounted at the front of shaft 28 and has link 37 attached to its lower end beneath the lever pivot 39. The purpose of the link 37 is to elevate the tail. Link 37 extends through hollow shaft 28 and is pivotally connected to the lower end of arm 41 that is fixed to the tail yoke 24.

Figure 7:
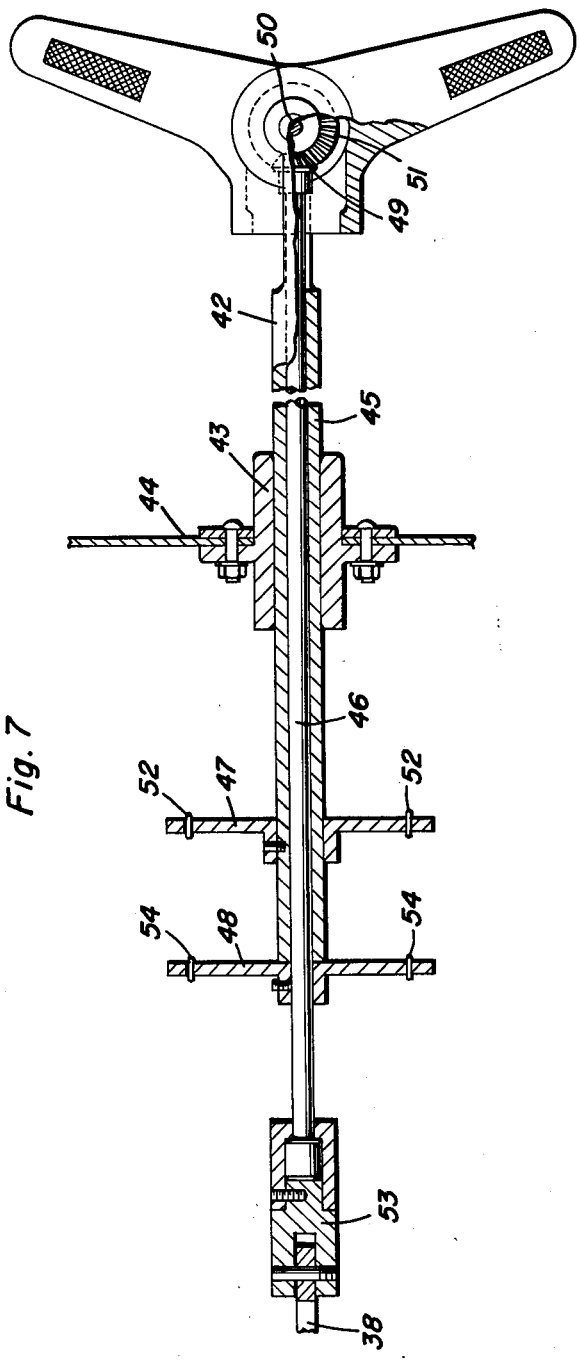
FIGURE 7 is an enlarged sectional view taken on the line 7—7 of FIGURE 4.

Control assembly 42 is mounted in a place convenient to the pilot, and it is operatively connected to control arms 36 and 36' attached to the outer and inner sections of shaft 28 and also connected to lever 38. Assembly 42 (FIGURE 7) is mounted in the airplane by structural support 44, and consists of a handle with which hollow shaft 45 is pivotally connected. An inner shaft 46 is disposed in hollow shaft 45, and it has a pinion 49 secured to its inner end. A vertical spindle 50 is used to attach the handle to the hollow shaft 45, the latter passing through aligned openings in the furcations at the inner end of hollow shaft 45 and through the handle. Gear 51 is fixed to the handle and is enmeshed with pinion 49 so that when the handle is adjusted about its spindle 50 gears 51 and 49 cause the inner shaft 46 to be rotated. Rocker arm 48 is splined or otherwise secured to the inner shaft 46, and rocker arm 47 is splined or otherwise secured to the outer hollow shaft 45. Cables 52 are secured to the ends of rocker arm 47 and to the ends of rocker arms 36' so that when the outer shaft 45 is rotated in either direction, the outer section of shaft 28 is correspondingly rotated. A pair of cables 54 is secured to the ends of rocker arm 48 and to the ends of rocker arm 36 so that when the inner shaft 46 is rotated, rocker arm 48, cables 54 and rocker arm 36 cause a corresponding rotation of the inner section 31 of hollow shaft 28. Lever 38 is attached to the outer end of shaft 46 by a pivot connection 53 so that when the handle assembly 42 is moved fore and aft i.e., slid in its bearing 43, the lever 38 is rocked thereby pushing and pulling link to ultimately cause up and down deflection of tail 8.

The means for articulating the wing semi-spans fore and aft on the fuselage are seen in FIGURE 5. They are of fairly simple construction, consisting of two screws 55 and 56 that are swivelly attached at their outer ends to the truss supports 9 and 11 by nuts 58 which are pivoted to trusses 9 and 11. The inner ends of the screws are located in gear box 57 containing miter gears at the ends of each of the screws 55 and 56 and a drive gear to which shafting 60 is secured. Crank 63 extends from gear box 64, the latter being secured to a part of the aircraft fuselage structure. Shafting 60 is driven by the gearing in gear box 64 so that screws 55 and 56 are rotated in the swivel nuts 58 in response to rotation of crank 63. Since the screws are threaded in opposite directions, one being a left hand thread and the other a right hand thread, the wings are caused to move fore and aft by the shifting of the truss supports 11 and 9 about kingpin 14 as the screws are rotated simultaneously.

Wing semi-span 6 has two areas considered as inboard panel 80 and outboard panel 81. The semi-span 7 has identical areas considered as inboard panel 82 and outboard panel 83. Panels 80 and 81 are joined at junction line 84 whose front end is at apex 85 and the leading edge of the semi-span 6. A similar junction line 86 is between panels 82 and 83, and the front end of the juncture line is at apex 87 of the semi-span 7. Each panel has a length of approximately 30 to 50% of the semi-span, and the exact shape of the inboard panels 80 and 82 is quite arbitrary. The outboard panels 81 and 83, though, are of a special shape. Each of these outboard panels has a symmetrical or a practically symmetrical airfoil section as shown in FIGURE 10. The trailing edge 89 (FIGURE 3) is elevated above the leading edge for approximately 70% of the outboard panel span. Then it drops below the leading edge near the junction line 84 or 86. The line generated by the trailing edge (FIGURES 3, 8 and 9) is smoothly curved upwardly as it extends toward the tip, then to the highest elevation at a rear portion of the tip and then smoothly curves downward toward the leading edge. The sectional shape of the outboard panel at a station which is approximately 75% of the outboard panel span is shown in FIGURE 11. The bottom surface 90 of the outboard panel has a flow velocity accelerating profile, for instance the shape of one-half a venturi, and the general appearance of the panel section is that the section is twisted upwardly approaching the trailing edge. The section of the outboard panel (FIGURE 10) has a negative angle of attack.

Figure 2:
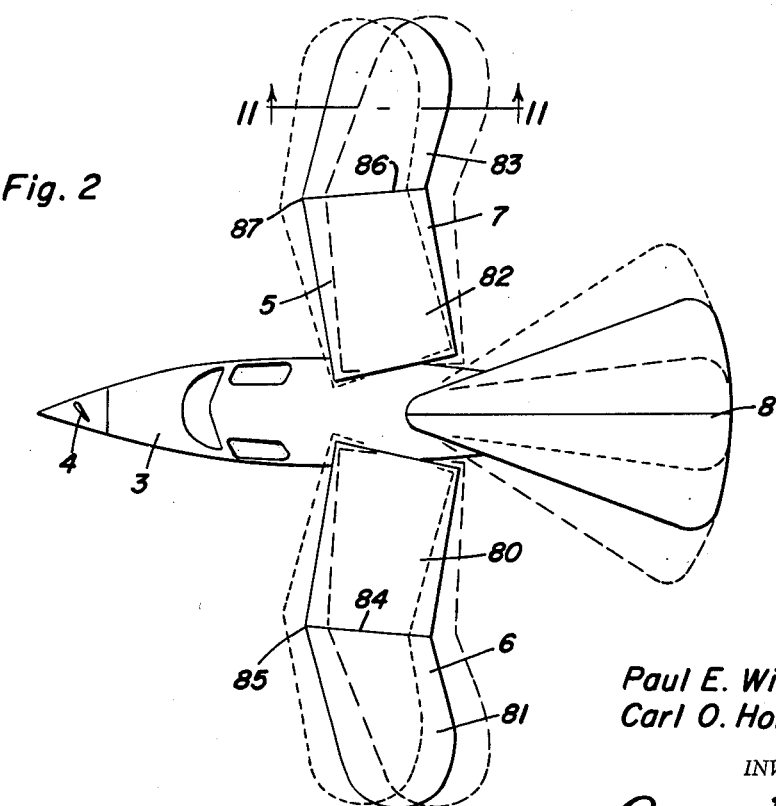
FIGURE 2 is a top view of the airplane showing the wing in solid lines in position for cruising flight, and in forward position in dotted lines for climbing and maximum lift, and in a rear position in dotted lines for high speed flight, the tail being shown in solid lines for straight and level flight and in the two dotted line positions for left and right turning.

Reference is again made to FIGURE 2 in order to observe the particular location of tail 8. The hinge axes of the tail are located at approximately the 70% chord station of the wing, and the modified delta tail extends to the rear of the wing when viewing the airplane from the top or from the side. This location of the tail has been found to be optimum for an airplane having the following specifications:

Weight _____ 1,000–2,500 lbs.
Span _____ 20–30 feet.
Inner panels area _____ 60–70 feet$^2$.
Outboard panel area _____ 90–110 feet$^2$.
Tail area _____ 20–30 feet$^2$.
Horsepower _____ 15–35 or less.

The following schedule discloses flight conditions i.e. aircraft attitude, lateral control, rolling and others, and the manner of achieving them in flying airplane 1.

(1) Wing semi-spans forward and tail down for maximum lift and maximum drag.

(2) Wings aft and tail level for minimum lift and minimum drag.

(3) Wings forward and tail up at some angle to have the fuselage longitudinal reference plane slightly inclined above the horizontal reference and the angle of descent equal to the angle of the tail.

(4) Rolling the tail (FIGURE 9) to roll the airplane. Rolling the tail spills the flow of the inboard panel on the low side so that the kinetic flow becomes less at the trailing edge of the inboard panel; and the tail continues the flow over the panel on high side of the tail so that the kinetic flow continues to the tip of the tail thereby maintaining higher lift on one wing semi-span and reducing lift on the other wing semi-span. Rolling results but there are no torsional forces transmitted from the tail to the airplane to cause the airplane to roll.

(5) To yaw the airplane, the tail is yawed and it induces a curvature (FIGURE 2) in the flow as the airplane moves forward. This is in contrast to the conventional rudder which creates a drag in the airstream with the drag being the force operating through a distance to the CG to form a moment arm for yawing the airplane.

The aerodynamic behavior of the airplane has been briefly discussed. Certain factors are to be emphasized. The outboard panels make it possible for inboard panels 80 and 82 to fly with pure laminar, two dimensional flow, giving the wing an infinite aspect ratio effect. Outboard panels 81 and 83 contribute to horizontal stability and stability along the X, Y and Z axes. The stream lines in FIGURE 10 show laminar flow, and the venturi principle applies.

It is observed from Bernoulli's equation that the induced velocity from the flow accelerating curved wing surface or modified venturi lower surface 90 of outboard panel 81, produces a controlled stream effective in resisting the dynamic pressure as well as forming a barrier at the inner section or juncture of the outboard panels and the inboard panels, for instance along juncture lines 84 and 86, producing a wall or barrier length at the juncture line 84 and 86 thereby producing infinite aspect ratio effect.

The flow over the inboard panels is chordwise because the outboard panels provide infinite aspect ratio due to the existence of the barriers created by the induced flow approximately at lines 84 and 86 by the spanwise and upward induced flow. According to Prandtl, the bound vortext in front of the wing creates a strong upwash increasing in magnitude as the flow approaches the wing. The velocity of the induced downwash (W) at the wing trailing edge is created by the trailing vortices extending upstream and downstream to infinity. The downwash is twice the magnitude of the local upwash (W). Adding the tail chord with a length ratio of 100% of the chord of the semi-span aft of the trailing edge of the panel, and a width from three-quarters to 1½ chords will produce an added velocity to the two dimensional flow over the wing and it has the effect of extending the wing semi-span chord and it further influences the flow over the entire center section (inboard panels) of the wing.

Tail 8 is effective as device for controlling air flow from the inboard panels. According to Prandtl in his discussion of viscosity, the leading edge of the airfoil is the stagnation point of flow over the surface of an airfoil whereat the velocity is zero. The pressure develops its greatest value over the surface of the airfoil; the flow continues beyond this point where it has an increased velocity and a drop in pressure. This condition continues up to the point of maximum thickness of the airfoil and a minimum pressure below ambient. The flow then advances into an area of increasing pressure. On conventional airplanes, the increasing pressure area is the point of adverse pressure gradient and the flow converts its kinetic energy to pressure energy in order to continue its directed motion. If there were no mechanical losses, the air would flow with constant energy. However, there is insufficient energy for the air to reach the trailing edge because the friction between particles of air, parasite drag, etc. will remove the energy in the boundary layer whether the flow is laminar or turbulent.

In accordance with the Kutta Joukowsky circulation theory, basic circulatory flow may be combined with other types of flow and the velocity at any point may be obtained by simple vector addition of the velocity components by means of super-position. (Aerodynamics of the Airplane by Millikan, printed 1941.)

The results obtained from using the tail as a means for controlling the flow of air from the inboard wing panels further improves the plane's performance in the sense that it enhances the two dimensional flow over the inboard panels of the wing. Using tail 8 in airplane 1, lift may be increased up to five times values now obtained by conventional wings of the same size.

When the wings of the aircraft are rotated about their vertical axes so that the tips thereof move towards the rear portion of the aircraft, it will descend in a nosing down attitude because the position of the center of lift of the wings has been shifted behind the position of gravity of the airplane. When the wings are pivoted forwardly so as to shift the center of lift thereof ahead of the center of gravity of the airplane, the nose of the aircraft rises, thereby resulting in a climbing attitude. To increase the lift and the drag of the aircraft which is desired when taking off and landing, the tail thereof is pivoted downwardly. Since the tail is in spanwise alignment with the trailing edge of the wing so as to in effect function as a continuation of the wing, when the tail moves downwardly it in effect increases the camber of the central portion of the wing thereby increasing its lift and drag. However, when the tail is moved downwardly, it causes a pitching force tending to nose the aircraft downwardly, and if it is desired to maintain level flight or to climb when the tail is down, this is accomplished by pivoting the wings forwardly in relation to the center of gravity so as to compensate for the pitching effects caused by the downward position of the tail. Thus it is obvious that with the tail all the way down and the wings all the way forward, the maximum amount of lift is obtained. When the tail is in the level horizontal position, it produces a minimum drag and at the same time has little affect on the lifting capacity of the wing. Therefore, the tail is maintained in a level or substantially horizontal position when maximum speed is desired, and the rate of climb or descent of the tail in this position is controlled by the position of the wings in relation to the center of gravity of the aircraft. Also, it is desirable to sweep the wings back as much as possible during high speed flight for reducing the drag produced thereby. When the aircraft is approaching the ground or landing, the wings are moved entirely forward and the tail is moved downward so as to raise the nose of the aircraft while at the same time creating a maximum amount of lift and drag for retarding the forward velocity thereof. This results in the aircraft touching the ground with a minimum of speed.

It is further understood that various changes may be made in the illustrated and described embodiments of the invention without departing from the protection of the following claims.

What is claimed as new is as follows:

1. In an airplane, a fuselage, a support member in the fuselage, a pair of arms, each arm pivotally supported at one end on the support member, a wing pivotally supported on the other end of each arm, a third arm on the support member, a tail and means to support the tail and the support member, said means comprising a universal joint structure having a part pivotally mounted on the third arm and a second part attached to the tail.

2. In an airplane, a fuselage having therein a seat and a support member, a pair of wings mounted on the support member, a tail means to support the tail on the support member, said means comprising a universal joint structure, one part of said joint structure being rigidly attached to said support member and the other part of said joint structure being rigidly attached to the tail, and a universal control assembly located adjacent the seat and having a triple connection to the tail to oscillate the tail, raise the tail and rotate the tail.

3. In an airplane, a fuselage, wings on the fuselage, a tail, a connection between the fuselage and the tail whereby the tail may swing on three axes with relation to the fuselage, and a control assembly in the fuselage having a triple connection with said connection to cause the tail to selectively turn on each axis.

4. An airplane comprising a fuselage, a tail, a wing including two semispans, each of said semispans being pivoted at its root end to said fuselage for pivotal movement on a generally vertical axis, pivot means connecting said tail at its forward portion to said fuselage adjacent the trailing edges of said semispans, said forward portion of the tail being disposed in spanwise alignment with said trailing edge of said semispans so as to in effect function as a continuation of the trailing edge of the wing, control means connected to said tail for moving it about said pivot means and connected to said semispans for pivoting them about said vertical axes for controlling said airplane.

5. An airplane as defined in claim 4 wherein said tail has a narrow forward portion and the sides thereof diverging rearwardly to form a generally triangular shape in plan.

6. An airplane as defined in calim 5 wherein said narrow portion is connected by said pivot means to said airplane between the roots of said semispans.

7. An airplane as defined in claim 4 wherein said pivot means permits said tail to pivot about a horizontal axis parallel to the pitch axis of the aircraft for varying the effective camber and lift of the wing and said semispans may pivot about said vertical axes so as to move the center of lift thereof to compensate for pitching forces caused by the up and down pivotal movement of said tail.

8. An airplane as defined in claim 4 wherein said pivot means permits said tail to pivot about an axis parallel to the longitudinal axis of said airplane for creating more lift on one side of the aircraft and causing it to roll.

9. An aircraft as defined in claim 8 wherein said pivot means further permits the tail to pivot on a vertical axis for causing said tail to function as a rudder.

10. An aircraft as defined in claim 4 wherein said pivot means comprises a universal joint whereby said control means may move said tail in any direction about said joint.

11. An airplane as defined in claim 4 wherein said wing has a positive angle of attack at its central portion and a negative angle of attack at its tips so as to cause said wing to have in effect an infinite aspect ratio.

References Cited in the file of this patent

UNITED STATES PATENTS

| | | |
|---|---|---|
| 1,002,724 | McDougall | Sept. 5, 1911 |
| 1,117,556 | Denine | Nov. 17, 1914 |
| 1,868,417 | Hill | July 19, 1932 |
| 2,576,981 | Vogt | Dec. 4, 1951 |
| 2,687,858 | Page | Aug. 31, 1954 |
| 2,695,144 | Woods | Nov. 23, 1954 |

FOREIGN PATENTS

| | | |
|---|---|---|
| 315,341 | Germany | Nov. 4, 1919 |
| 718,483 | Great Britain | Nov. 17, 1954 |